Sept. 5, 1967 AKIRA IRIBE 3,339,816

PINCH ROLLER DEVICE FOR TAPE RECORDER

Filed Oct. 22, 1965 2 Sheets-Sheet 1

INVENTOR
AKIRA IRIBE
By Linton and Linton
ATTORNEYS

Sept. 5, 1967 AKIRA IRIBE 3,339,816

PINCH ROLLER DEVICE FOR TAPE RECORDER

Filed Oct. 22, 1965 2 Sheets-Sheet 2

INVENTOR
AKIRA IRIBE
By Linton and Linton
ATTORNEYS

United States Patent Office 3,339,816
Patented Sept. 5, 1967

3,339,816

PINCH ROLLER DEVICE FOR TAPE RECORDER

Akira Iribe, % Yaou Electric Co. Limited, 1116 Suenaga, Kawasaki-shi, Kanagawa-ken, Japan Filed Oct. 22, 1965, Ser. No. 501,983
Claims priority, application Japan, Nov. 18, 1964, 39/64,787
2 Claims. (Cl. 226—90)

This invention relates to a pinch roller device for tape recorders and has particular reference to such device which permits uniform peripheral contact of a pinch roller with a capstan roller.

There may be considered a number of factors which determine a high-fidelity recording and reproduction of tape. One example in mechanical aspect would be a uniform pinch roller to capstan roller contact to assure a tape travel at constant speed. However, due to errors in the design and installation of a pinch roller assembly, or due to deformation or wear of the pinch roller generally of rubber, the contact thereof with the capstan tends to become irregular with the result that the tape moves faser at some instant than at other instants. This leads to the problem of wow and flutter.

In addition to the above difficulty, it has been found quite cumbersome to thread the tape between the pinch roller and the capstan because the former is in most cases retractable only a limited distance apart from the latter.

Whereas, it is the primary object of this invention to provide improved and useful pinch roller assembly which will eliminate the above-noted difficulty.

It is another object of the invention to provide new and useful means of assuring uniform contact of the pinch roller with the capstan roller.

It is a further object of the invention to provide new and useful means of providing sufficient space for threading the tape through its transport path by enabling the pinch roller to flip down below or to the level of the tape recorder deck.

These and other objects and features of the invention will become more apparent from the following description taken in connection with the accompanying drawings which illustrate a preferred embodiment of the invention but should not be regarded as limiting the invention thereto. In the drawings.

Figure 1:
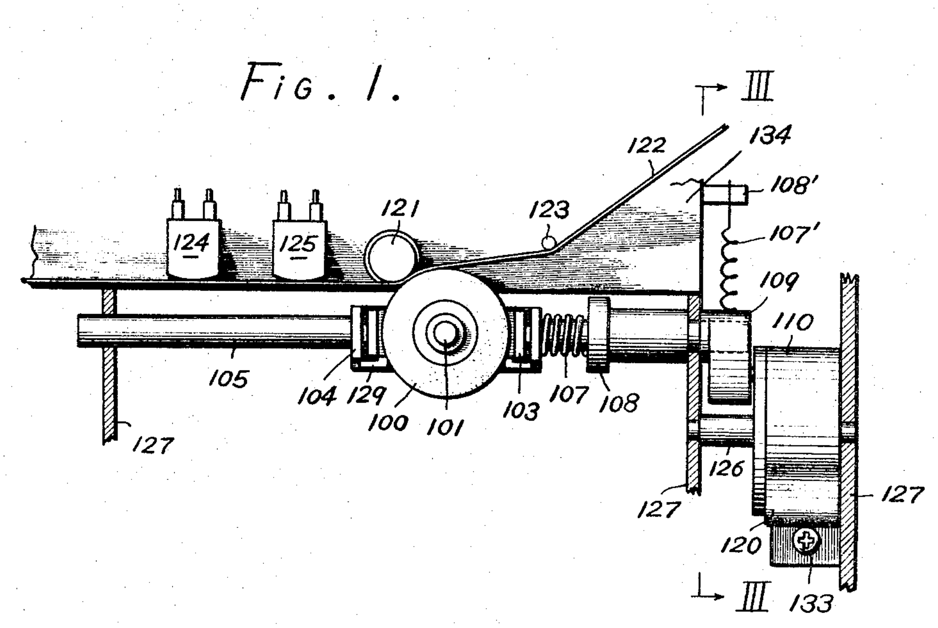
FIG. 1 is a plan view of a pinch roller device embodying the invention, illustrating the pinch roller as in contact with the capstan.
Figure 2:
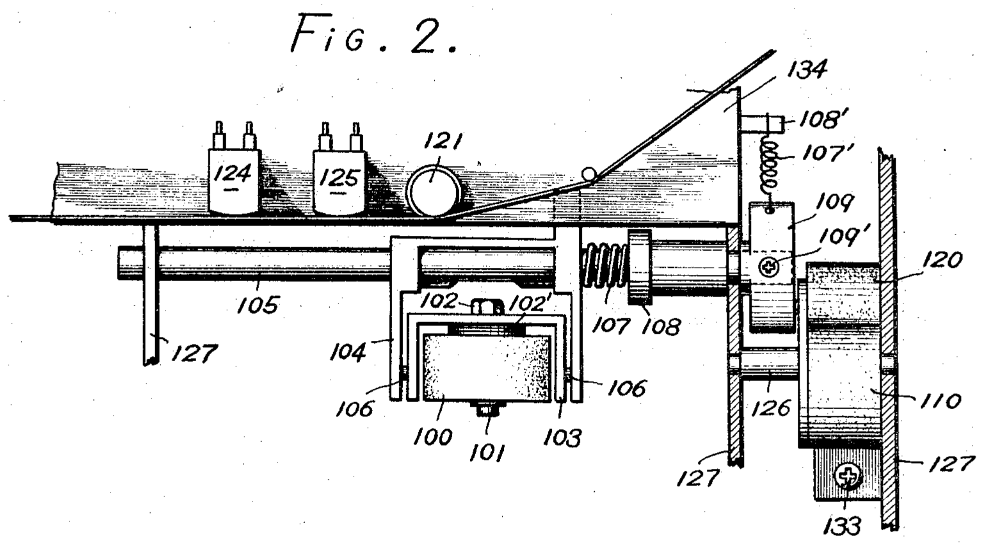
FIG. 2 is a similar plan view, illustrating the pinch roller as being separate apart from the capstan.
Figure 3:
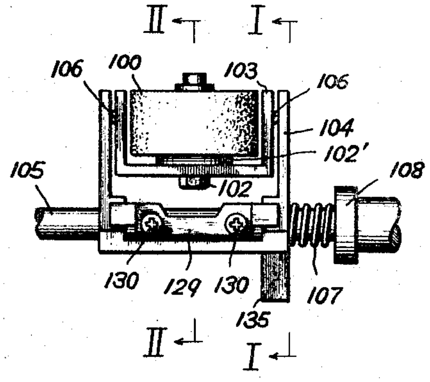
FIG. 3 is an elevational view of the pinch roller assembly.

A preferred embodiment of the invention, illustrated generally in FIGS. 1 and 2, essentially comprises a rubber pinch roller 100 having an end of its shaft 101 bolted at 102 through a washer 102′ to a first bracket member 103, a second bracket member 104 loosely mounted on a rod member 105 and connected through a pin 106 of substantially triangular cross section to said first bracket member, a coil spring 107 having one end secured to said second bracket member and the other end to a flange 108 formed integrally with said rod member and a cam follower 109 engaged with a cam disc 110 having a knob 120 integrally formed therewith.

Reference now to FIG. 1 shows this arrangement with the pinch roller 100 held in operative position, i.e. pressing the tape 122 against the capstan 121 so that the tape moves towards a take-up reel or supply reel (neither illustrated) as the case may be. Designated at 123 is a tape guide roller and at 124 and 125 are a record/playback head and an erase head, respectively. These and all other components and parts are of the usual construction, hence are neither illustrated nor discussed hereinafter as they do not constitute essential part of the invention.

Figure 4:
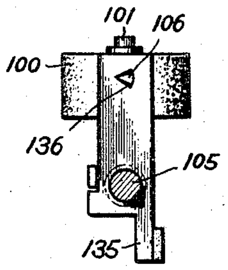
FIG. 4 is a cross-sectional view taken on line I—I of FIG. 3.
Figure 5:
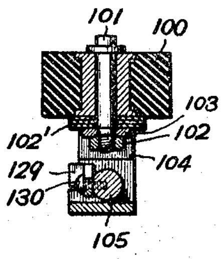
FIG. 5 is a cross-sectional view taken on line II—II of FIG. 3.
Figure 6:
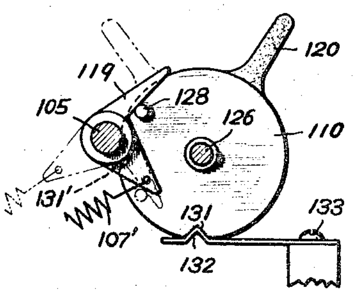
FIG. 6 is a cross-sectional view taken on line III—III of FIG. 1 which depicts a cam mechanism forming part of the pinch roller assembly according to the invention, and FIGS. 7*a* through 7*c*, inclusive, are views similar to FIG. 4 which are utilized to show how the pinch roller is maintained in uniform contact with the capstan under the various conditions.
Figure 6:
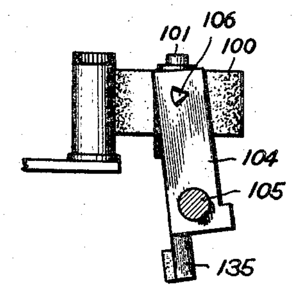
Figure 6:
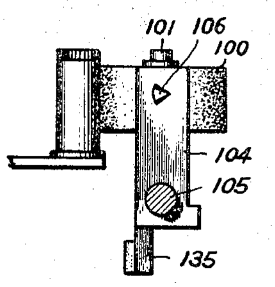
Figure 6:
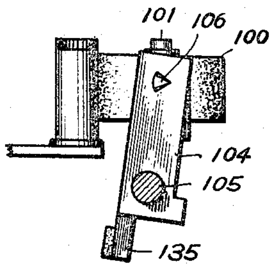

To bring the pinch roller 100 to non-operative position, i.e. released from the capstan 121, as shown in FIG. 2, the knob 120 may be pushed upwards to a point limited by the shape of the cam mechanism more clearly shown in FIG. 6. Designated at 109 is a cam follower screwed at 109′ to the rod 105 of increased diameter, and retained in place by spring 107′ attached to a lug 108′. As the knob 120 is pushed upwards, the cam disc 110 rotates about a shaft 126 secured to a frame member 127, causing the cam 109 to follow by an angular distance slightly exceeding 90° about a pin 128. This cam movement causes the rod member 105 to rotate substantially 90° and in a direction opposite to the movement of the cam disc 110, as this will be obvious from this cam action. The coil spring 107 is adapted to be compressed when the knob 120 is pushed downwards so that the pinch roller 100 may be pressed tightly against the capstan 121. It will be appreciated theoretically that the pinch roller 100 may be brought into contact with the capstan 121 if the rod member 105 is rotated 90°. However, it is necessary to compensate for the mechanical accuracy required to achieve uniformity and parallelism in the pinch roller to capstan contact, as the second bracket member 104 carrying the pinch roller 100 is movably mounted on the rod member 105 but restricted by a stopper 129 screwed at 130 to the rod 105 and supported at one end on the coil spring 107. For this purpose, the coil spring 107 is adapted to act upon the second bracket member 104 when the rod member 105 has turned in excess of 90°, thereby assuring tight engagement of the pinch roller 100 with the capstan 121. To further assure a uniform pinch roller to capstan alignment, there is provided a slot of substantially triangular shape 136 in each side of the second bracket member 104 for loose engagement with the triangular pin 106 as shown in FIG. 4. This knife-edge device is intended to give a mechanical play to the pinch roller 100 so that it can maintain parallel and uniform contact with the capstan 121 even if the second bracket member 104 takes such different positions by any cause as illustrated in FIGS. 7*a*, 7*b* and 7*c*.

As a means of operating the pinch roller assembly of the above construction, there is used a cam mechanism in this specific embodiment such as shown in FIG. 6. The cam disc 110 is provided on its peripheral surface with two recesses 131, 131′ spaced over 90° apart which alternately engage a projection 132 formed on a metal strip attached by screw 133 to the deck 134 of the recorder.

With this construction, as the knob or handle 120 is turned counter clockwise (as shown in chain line at FIG. 6) until the recess 131′ of the cam disc 110 engages the projection 132, the pinch roller 100 is released from the capstan 121 and flipped down with a tongue or extension 135 of the second bracket member 104 hooked underneath the deck 134.

While the method herein described and the form of apparatus for carrying this method into effect constitute a preferred embodiment of the invention, it is to be understood that the invention is not limited to this precise construction and that certain changes or modifications may be made without departing from the spirit and scope of the invention which is defined in the appended claims.

What is claimed is:

1. In a pinch roller device for pressing a recording tape against a capstan roller in a tape recording apparatus, in combination, a rubber pinch roller having a shaft, one end of said shaft being secured to a first bracket member, a rotatable rod member adapted to mount loosely thereon a second bracket member, said first bracket member being connected by a pin to said second bracket member, a coil spring having one end secured to said second bracket member and the other end to said rod member and a cam mechanism adapted to cause said rod member to rotate slightly in excess of 90°.

2. In a pinch roller device for pressing a recording tape against a capstan roller in a tape recording apparatus, in combination, a rubber pinch roller having an end of its shaft secured to a first bracket member, a rotatable rod member adapted to mount loosely thereon a second bracket member, said first member being connected by a pin of substantially triangular cross section to said second bracket member, a coil spring having one end secured to said second bracket member and the other end to said rod member and a cam mechanism adapted to cause said rod member to rotate slightly in excess of 90°.

References Cited

UNITED STATES PATENTS

| | | | |
|---|---|---|---|
| 3,148,819 | 9/1964 | Frick et al. | 226—176 |
| 3,164,331 | 1/1965 | Hardy | 226—176 X |
| 3,167,267 | 1/1965 | Crane | 226—187 X |
| 3,248,066 | 4/1966 | Andrews | 226—187 X |
| 3,298,583 | 1/1967 | Weathers et al. | 226—176 X |

M. HENSON WOOD, Jr., *Primary Examiner.*

ALLEN N. KNOWLES, *Assistant Examiner.*